United States Patent [19]

Mills

[11] Patent Number: 4,967,692
[45] Date of Patent: Nov. 6, 1990

[54] DISPOSABLE COMMODE FOR ANIMALS

[76] Inventor: Alan D. Mills, P.O. Box 206, Middleton, Id. 83664

[21] Appl. No.: 195,122

[22] Filed: May 17, 1988

Related U.S. Application Data

[63] Continuation-in-part of Ser. No. 73,507, Jul. 15, 1987, abandoned.

[51] Int. Cl.$^5$ .................... A01K 1/035; B65D 5/20
[52] U.S. Cl. ...................... 119/168; 229/169
[58] Field of Search .................. 119/1; 229/165, 169, 229/175

[56] References Cited

U.S. PATENT DOCUMENTS

| | | | |
|---|---|---|---|
| 1,824,927 | 9/1931 | Powell | 229/169 X |
| 2,619,276 | 11/1952 | Gibbons | 229/165 X |
| 3,154,052 | 11/1964 | Sweeney | 119/1 |
| 3,581,977 | 6/1971 | Kirsky et al. | 119/1 X |
| 3,735,734 | 5/1973 | Pierce et al. | 119/1 |
| 4,305,544 | 12/1981 | Noonan | 119/1 |
| 4,437,429 | 3/1984 | Goldstein et al. | 119/1 |
| 4,548,160 | 11/1985 | Feitelson | 119/1 |
| 4,628,863 | 12/1986 | Eichenauer | 119/1 |
| 4,702,409 | 10/1987 | Osborne | 229/169 X |

Primary Examiner—Robert P. Swiatek
Attorney, Agent, or Firm—Andrew C. Hess

[57] ABSTRACT

A disposable animal commode comprising a six-sided structure having a bottom wall, four side walls and an articulating top wall which is attached to one of the side walls and which may be rotated between a closed position and an open position. When in the closed position, the commode seals so as to substantially retain a litter material and animal waste within the commode. Positioned within the six-sided structure is a height extender which sufficiently extends the height of the side walls of the commode to substantially retain litter material within the commode when in use by an animal. The height extender comprises flaps which rotate between a vertical position and a horizontal position, the edges of the flaps being connected as to form corners which reverse inward upon themselves when the height extender is rotated to the horizontal position.

7 Claims, 3 Drawing Sheets

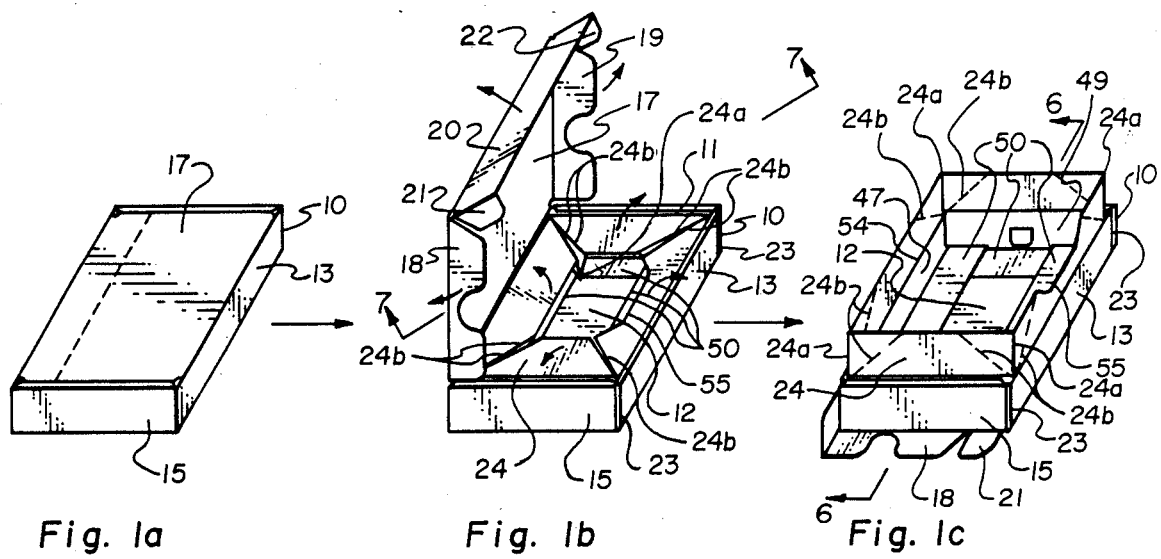
Fig. 1a  Fig. 1b  Fig. 1c
Fig. 1
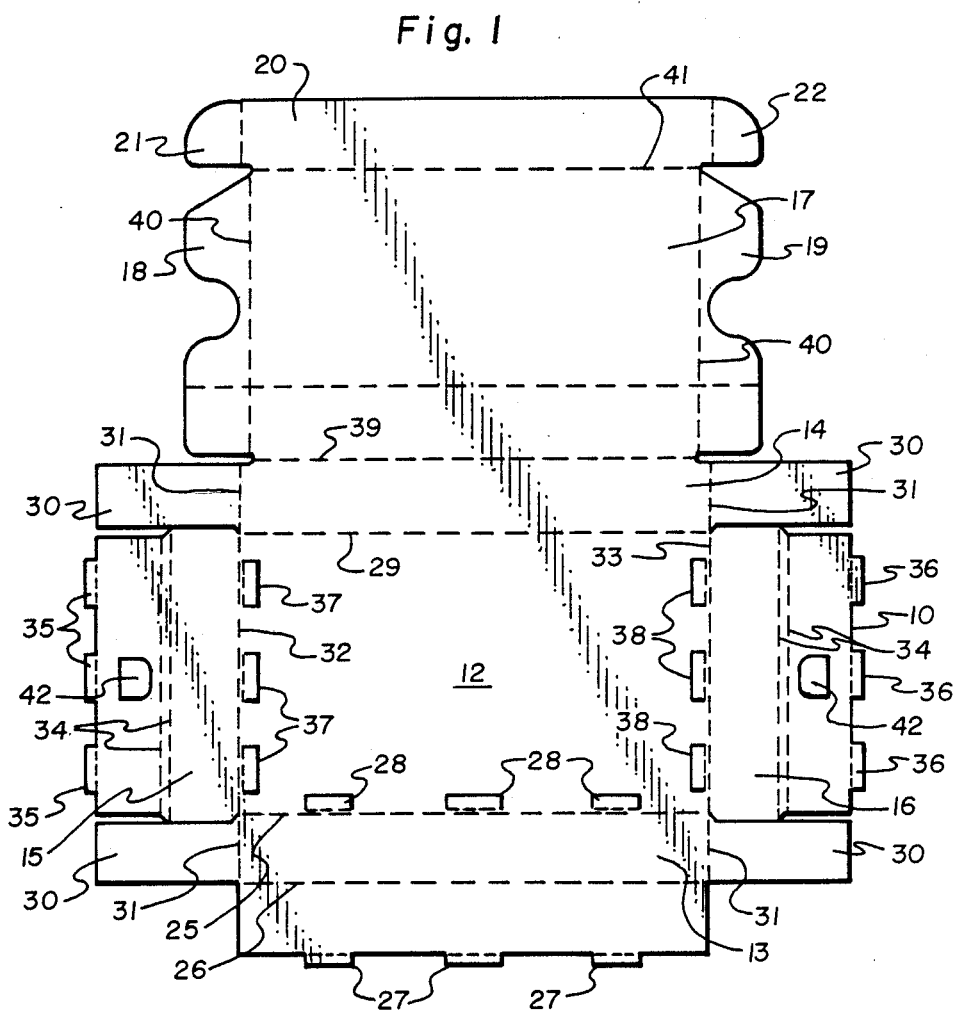
Fig. 2 dispos
DISPOSABLE COMMODE FOR ANIMALS

RELATED APPLICATION

This application is a continuation-in-part of my application entitled "Disposable Commode for Animals" U.S. Ser. No. 07/073,507, filed July 15, 1987, and now abandoned.

BACKGROUND OF THE INVENTION

1. Field

This invention relates generally to commodes for animals particularly disposable litter boxes for pets.

2. State of the Art

One of the inherent problems of owning a small animal as a pet is the handling and disposal of animal waste, particularly when the animal is trained to use indoor toilet facilities. Litter boxes are frequently used for the sanitary indoor handling of animal waste. Traditionally, litter boxes have fallen into three classes: nondisposable, partially disposable and completely disposable.

Nondisposable litter boxes are fairly expensive in cost and are constructed of either plastic, wood or other suitable material. They usually contain a litter material. When the litter material is soiled, it is cleaned through the use of a sieve which removes the animal waste and allows the litter material to pass through the sieve back into the litter box. This procedure, however, removes only the solid waste, and the liquid waste is absorbed into the litter material. After a short period of use the litter material becomes saturated with the liquid waste and odor and disease control become problems. Eventually, disposal of the soiled litter material is required, the litter box cleaned and clean litter material supplied. These procedures usually result in the unpleasant task of handling soiled litter material and scrubbing the litter box.

To overcome direct handling of soiled litter material and contact with the soiled litter box, partially disposable animal commodes were developed. These systems usually take the form of a permanent or semi-permanent litter box with a replaceable and disposable liner in which the litter material is contained. After the litter material is sufficiently soiled, the soiled litter material and disposable liner are removed. A new liner is then installed and new litter material added. Typically, the liner is constructed of thin plastic, which is subject to rips and tears when the commode is used by the animal. Additionally, most litter boxes which are used in the partially disposable systems are very shallow and do not adequately retain the litter material when the commode is used by the animal.

There are a number of disposable animal commodes which are presently available, or on which letters of patent have been granted. These products usually consist of a shallow tray, and some include a litter material. Most are not resealable, nor do they have appropriate height for proper retention of the litter material within the litter box. All of these prior products have the potential for the spread of diseases associated with litter material and animal waste, particularly waste from cats, through contact with soiled litter material, animal waste and surfaces of the animal commode which are exposed to or in contact with these items. One disease of special concern to pregnant women is toxoplasmosis, which can be contracted through contact with cat waste and litter material soiled by cats. Typical products are the folding disposable Kleen Kitty ® Litter Tray which is marketed by Superior Pet Products, Inc. of Boston, Massachusetts; the Litter Kneat ® Litter Box which is marketed by Midwest Green Products, Inc. that consists of a nonresealable litter box which utilizes an alfalfa pellet litter material; and the nonresealable Kleener Kitty Disposable Cat Box marketed by Snake River Minerals, Inc. which appears to use a diatomaceous earth litter material.

Various patents which have been issued on disposable litter boxes include the following: U.S. Pat. No. 4,628,863, issued to Eichenauer on Dec. 12, 1986; U.S. Pat. No. 4,548,160, issued to Feitelson on Oct. 22, 1985; U.S. Pat. No. 4,437,429, issued to Goldstein et. al. on Mar. 20, 1984; U.S. Pat. No. 4,441,451, issued to Neal on Apr. 10, 1984; U.S. Pat. No. 4,348,892, issued to Selby on Sept. 14, 1982; U.S. Pat. No. 4,271,787, issued to Wellman on June 9, 1981; U.S. Pat. No. 3,745,975, issued to Prucha on Dec. 15, 1981; U.S. Pat. No. 4,305,544, issued to Noonan on Dec. 15, 1981; U.S. Pat. No. 4,014,292, issued to Coughlin on Mar. 29, 1977; U.S. Pat. No. 3,735,734, issued to Pierce on Mar. 20, 1980; U.S. Pat. No. 3,743,170, issued to Riccio on July 3, 1973; U.S. Pat. No. 3,154,052, issued to Sweeney on Oct. 27, 1964; and U.S. Pat. No. 2,741,223, issued to Winborn on Apr. 10, 1956.

SUMMARY OF THE INVENTION

Objectives

In the making of the invention, it was an objective to provide an inexpensive and easily manufactured disposable commode for animals which is completely resealable for traveling and sanitary disposal purposes. It is a further objective of the invention to provide an animal commode which is suitable for storage, transportation and display for marketing purposes, and is easily and safely transportable from the point of purchase to the site of use and to the site of final disposal, particularly reducing risk when soiled litter is being transported and handled by sanitation engineers in the open environment. It is a further objective of the invention to provide an animal commode which is moisture resistant and minimizes contact with soiled litter material. It is a further objective of the invention to minimize the spread of disease related to animal waste and litter material, especially toxoplasmosis, through minimal contact with animal waste, soiled litter material and surfaces which come into contact with those items when the animal commode is handled. It is a further objective of the invention to provide an animal commode which retains the litter material when being used by the animal. A final objective of the invention is to provide an animal commode which utilizes a litter material having highly efficient odor control and moisture absorption properties which result in a relatively long lasting period of use of the animal commode.

Features

In the accomplishment of the foregoing objectives of the invention, the animal commode comprises a six-sided structure having a bottom wall, four side walls and an articulating top wall which is attached to one of the side walls and which may be rotated between a closed position and an open position. The six-sided structure is a box having a horizontal bottom wall with a front edge, back edge, left edge and right edge; a vertical front wall with a top edge, bottom edge, left edge and right edge, which front wall is connected along its bottom edge to the front edge of the bottom wall; a vertical back wall with a top edge, bottom edge, left edge and right edge, which back wall is connected along its bottom edge to the back edge of the bottom wall; a vertical left wall having a top edge, bottom edge, front edge and back edge, which left wall is connected along its bottom edge to the left edge of the bottom wall, and connected to the left edge of the front wall along its front edge and to the left edge of the back wall along its back edge; a vertical right wall having a top edge, bottom edge, front edge and back edge, which right wall is connected along its bottom edge to the right edge of the bottom wall, and to the right edge of the front wall along its front edge, and to the right edge of the back wall along its back edge; and an articulating top wall having a front edge, back edge, left edge and right edge, which top wall is connected along its back edge to the top edge of the rear wall and can be rotated from a closed position to an open position. The articulating top wall acts as a lid for the five-sided structure formed by the bottom wall, front wall, back wall, left wall and right wall. When the top wall is in the closed position the six sided structure is formed, and a sealing means is utilized to substantially retain litter material within the six-sided structure.

The preferred sealing means are left and right sealing flaps attached to the left and right edges of the top wall, respectively, that fold perpendicular to the top wall and insert inside of the five-sided box structure adjacent to the left and right walls, respectively, when the top wall is articulated to the closed position. Attached to the front edge of the top wall is a front sealing flap having left and right front sealing tabs. The front sealing flap is folded over the outside of the front wall and the front sealing tabs are slipped into front retention slots to seal the six-sided structure.

A height extension means is associated with the animal commode which is of sufficient height to substantially retain litter material within the animal commode when in use by an animal. Preferably, the height extension means is a four-sided height extender which inserts inside of the six-sided structure such that the four sides of the height extender are adjacent to the front wall, back wall, left wall and right wall, respectively. The gaps between the left and right sides of the height extender and the adjacent left wall and right wall form slots into which the left and right sealing flaps insert to seal litter material within the animal commode when in the closed position. Each of the four sides of the height extender have an articulating extension flap attached to the top edge of each of the four sides. Each extension flap may be rotated to a horizontal position beneath the articulating top wall when it is in the closed position, and rotated to a vertical position when the articulating top wall is rotated to the open position. When the extension flaps are rotated to the horizontal position and the top wall rotated to the closed position, the top edges of the extension flaps are in contact with the inside of the top wall, forming a secondary means of containing the litter material within the closed animal commode. In the preferred embodiment the extension flaps are constructed such that they are self supporting and are rotatable from the horizontal position to the vertical position and vis versa without contact with soiled litter material or interior surfaces of the height extension means which are exposed to soiled litter material or animal waste. The extension flaps are also constructed such that they cannot be folded outward and, although self supporting, are flexible enough to discourage animals from perching on the top edges of the extension flaps when rotated to the vertical position. Each of the four sides of the height extender have a support tab attached to the bottom edge of each of the four sides. To provide rigidity and support to the height extender, the support tabs are folded inward so that they are perpendicular to their respective side of the height extender.

The animal commode is filled with an animal litter material which has the properties of odor control and moisture absorption. Preferably, the litter material is a blend of high quality diatomaceous earth and clinoptilolite, a specific zeolite mineral.

DRAWINGS OF THE ILLUSTRATED EMBODIMENT

The best mode presently contemplated for carrying out the invention is shown on the accompanying drawings, in which:

FIG. 1 is a perspective view of the animal commode having subparts 1(*a*), 1(*b*), and 1(*c*) which generally depict the animal commode in the fully closed and sealed position (FIG. 1(*a*)) to the fully open and extended position (FIG. 1(*c*)) ready for animal use;

FIG. 2 is a top view of a sheet of box board cut and scored ready to be folded into the box portion of the animal commode of FIGS. 1 and 3;

DETAILED DESCRIPTION OF THE ILLUSTRATED EMBODIMENT

Figure 3:
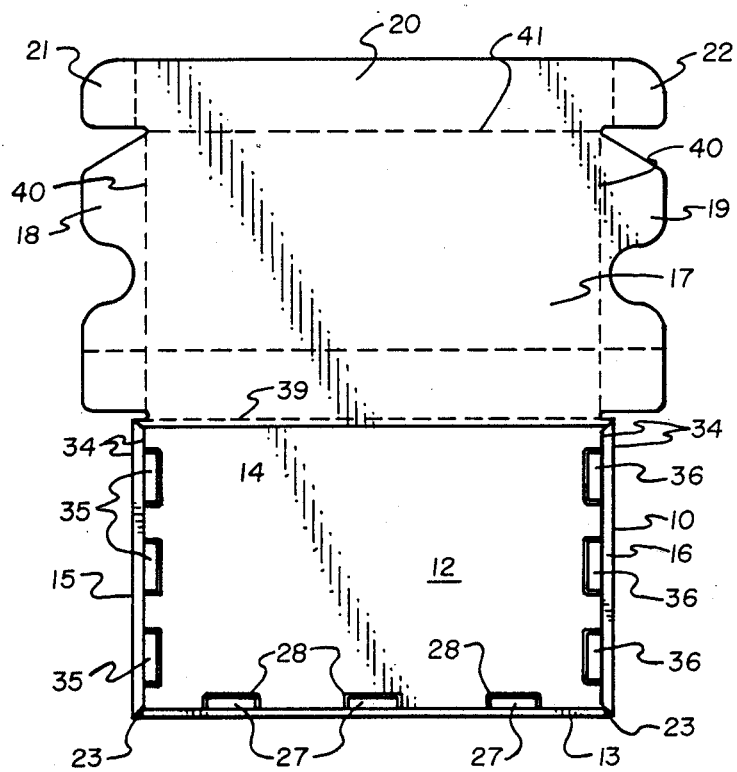
FIG. 3 is a top view of the box portion of the animal commode and the box board of FIG. 2 after being folded into the box.

FIGS. 1 through 7 illustrate a presently preferred embodiment of the animal commode according to the invention. The animal commode is constructed of two portions, a box 10 and a height extender 11 which is associated with box 10 which is designed for easy set up and take down with minimum or no contact with animal waste and litter material, and surfaces exposed thereto, and which is of sufficient height to keep litter material within the animal commode when in use by an animal. Box 10 is constructed of a flexible, sturdy and moisture-resistant material. The preferred construction material for box 10 is a sturdy corrugated cardboard having a layer of moisture-resistant material, such as polypropylene. Height extender 11 is constructed of a flexible and sturdy material. The material of height extender 11 may also be moisture resistant. The preferred construction material for height extender 11 is corrugated cardboard.

FIGS. 1(*a*), 1(*b*) and 1(*c*) are perspective views of the animal commode generally depicting the transition of the animal commode from a totally closed and sealed position (FIG. 1(*a*)), to a partially open position (FIG. 1(*b*)), to a fully open and extended position ready for use by an animal (FIG. 1(*c*)). Preferably height extender (11) is retained within box 10 as illustrated in FIGS. 1(*a*), 1(*b*) and 1(*c*). The arrows of FIG. 1(*b*) illustrate the motion which is required to unseal box 10 and fully extend height extender 11.

Box 10 comprises a six-sided structure having a horizontal bottom wall 12 with a front edge, back edge, left edge and right edge; a vertical front wall 13 with a top edge, bottom edge, left edge and right edge, which front wall 13 is connected along its bottom edge to the front edge of bottom wall 12; a vertical back wall 14 with a top edge, bottom edge, left edge and right edge, which back wall 14 is connected along its bottom edge to the back edge of bottom wall 12; a vertical left wall 15 having a top edge, bottom edge, front edge and back edge, which left wall 15 is connected along its bottom edge to the left edge of bottom wall 12, and connected to front wall 13 along its front edge the left edge of front wall 13 and to back wall 14 along its back edge and the left edge of back wall 14; a vertical right wall 16 having a top edge, bottom edge, front edge and back edge, which right wall 16 is connected along its bottom edge to the right edge of bottom wall 12, and to front wall 13 along its front edge and the right edge of front wall 13, and to back wall 14 along its back edge and the right edge of the back wall 14; and an articulating top wall 17 having a front edge, back edge, left edge and right edge, which top wall 17 is connected along its back edge to the top edge of back wall 14 and can be rotated from a closed position (FIG. 1(a)) to an open position (FIG. 1(c)). The articulating top wall 17 acts as a lid for the five-sided structure formed by bottom wall 12, front wall 13, back wall 14, left wall 15 and right wall 16. When the articulating top wall 17 is in the closed position the six sided structure is formed, and top wall 17 utilizes a sealing means to seal litter material within the six-sided structure.

The preferred sealing means are a left sealing flap 18 and a right sealing flap 19 attached to the left and right edges of top wall 17, respectively, that fold perpendicular to top wall 17 and insert inside of the five-sided box structure adjacent to left wall 15 and right wall 16, respectively, when top wall 17 is articulated to the closed position. Attached to the front edge of top wall 17 is a front sealing flap 20 having a left sealing tab 21 and right sealing tab 22. Front sealing flap 20 is folded over the outside of front wall 13 and the left sealing tab 21 and right sealing tab 22 are slipped into front retention slots 23 to seal the six-sided structure.

Figure 7:
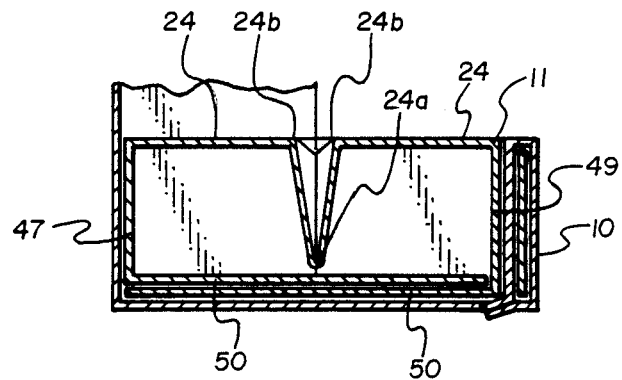
FIG. 7 is an enlarged cross section of FIG. 1(*b*) taken along line 7—7.

A height extension means is associated with the animal commode. Preferably, the height extension means is a height extender 11 having four sides which insert inside of box 10 such that the four sides of height extender 11 are adjacent to front wall 13, back wall 14, left wall 15 and right wall 16, respectively. The gaps between the left side of the height extender and left wall 15 and right side of the height extender and right wall 16 form slots into which the left sealing flap 18 and right sealing flap 19 insert to seal the sides of the six sided structure. Each of the four sides of height extender 11 has articulating extension flaps 24 attached to the top edge of each of the four sides. Each extension flap 24 may be rotated to a horizontal position beneath articulating top wall 17 when it is in the closed position, and rotated to a vertical position when articulating top wall 17 is rotated to the open position. Each extension flap 24 is connected to an adjacent extension flap at its edges to form a corner 24a when the extension flaps are in the extended vertical position. When the extension flaps are rotated to the folded horizontal position, the corners reverse and fold inwardly along perforation lines 24b, as illustrated in FIGS. 1(b) and 7. The rotation of the extension flaps 24 to the horizontal position and the inward folding of the corners 24a of the height extender is accomplished by pressing inward on the outer surface of each corner 24a and the closing of the top wall 17 to the closed position, thereby not requiring contact with the inner surfaces of the animal commode which have come in contact with animal waste or soiled litter material.

FIG. 2 is a top view of a sheet of box board, cut and scored ready to be folded into box 10. Front wall 13 is formed by folding front wall 13 upward along score line 25 until front wall 13 and bottom wall 12 are perpendicular to each other. Front wall 13 is then folded once again along score line 26 and front wall retention tabs 27 are inserted into front wall retention slots 28. Back wall 14 is formed by folding back wall 14 upward along score line 29 until back wall 14 is perpendicular to bottom wall 12. The left and right edges of front wall 13 and back wall 14 are extended with corner sealing tabs 30. Corner sealing tabs 30 are folded inward along score lines 31 until they are perpendicular with front wall 13 and back wall 14. Left wall 15 and right wall 16 are formed by folding left wall 15 and right wall 16 in an upward direction along score lines 32 and 33, respectively, until left wall 15 and right wall 16 are perpendicular with bottom wall 12. Left wall 15 and right wall 16 are then folded inward along score lines 34 to wrap over corner sealing tabs 30. Left wall 15 and right wall 16 are retained in a vertical position by inserting left wall retention tabs 35 and right wall retention tabs 36 into left wall retention slots 37 and right wall retention slots 38, respectively. Articulating top wall 17 is formed by folding along score line 39.

FIG. 3 is a top view of box 10 folded to form bottom wall 12, front wall 13, back wall 14, left wall 15, right wall 16 and articulating top wall 17. In FIG. 3 articulating top wall 17 is in a partially open position. To close and seal box 10, the left sealing flap 18 and right sealing flap 19 are folded along score lines 40 in an inward direction and perpendicular to articulating top wall 17. As articulating top wall 17 is rotated to the closed position, left sealing flap 18 and right sealing flap 19 are inserted inside of and adjacent to left wall 15 and right wall 16, respectively. Completion of sealing box 10 is accomplished by folding front sealing flap 20 downward along score line 41 until it is adjacent to the outside of front wall 13. Left sealing tab 21 and right sealing tab 22 are positioned adjacent to the outside of the corner sealing tabs 30 and into front retention slots 23 which were formed by folding the left and right walls 15 and 16 inwardly against themselves as previously described. Cut into the inside surfaces of the left and right walls 15 and 16 are height extender retention slots 42.

Figure 4:
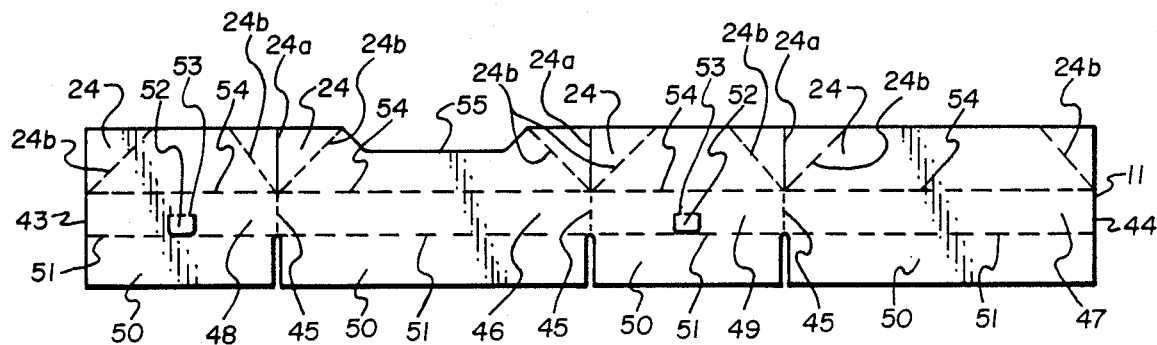
FIG. 4 is a top view of a sheet of box board cut and scored ready to be folded into the height extender portion of the animal commode of FIGS. 1 and 5.
Figure 5:
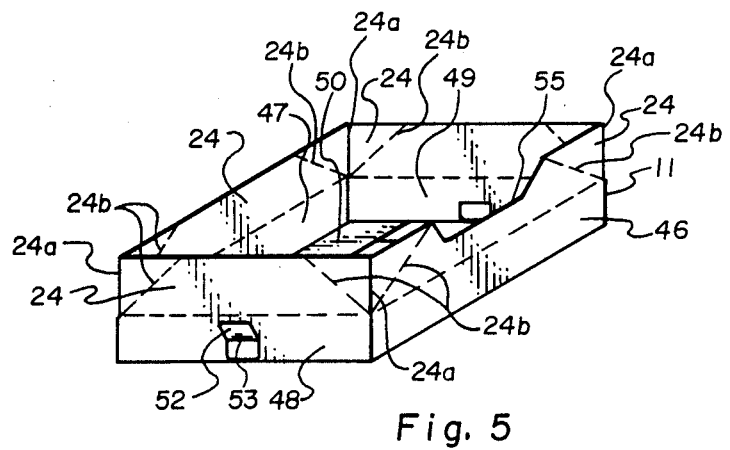
FIG. 5 is a perspective view of the height extender portion of the animal commode of FIG. 4 after being fully folded into the height extender.

FIG. 4 is a top view of a sheet of box board cut and scored ready to be folded into height extender 11. Height extender 11 is formed by attaching the left edge 43 and right edge 44 together and folding along score lines 45 to form a four-sided structure. The four-sided structure has a front side 46, a back side 47 parallel to front side 46, a left side 48 perpendicular to front side 46 which connects to the front and back sides 46 and 47; and a right side 49 perpendicular to front side 46 which connects front and back sides 46 and 47. To add rigidity and support to the height extender 11 support tabs 50 are folded inward along score lines 51. Although not required, support tabs 50 may be of sufficient size to provide a fully continuous bottom side and may be glued into the folded position at the points where they overlap one another.

Figure 6:
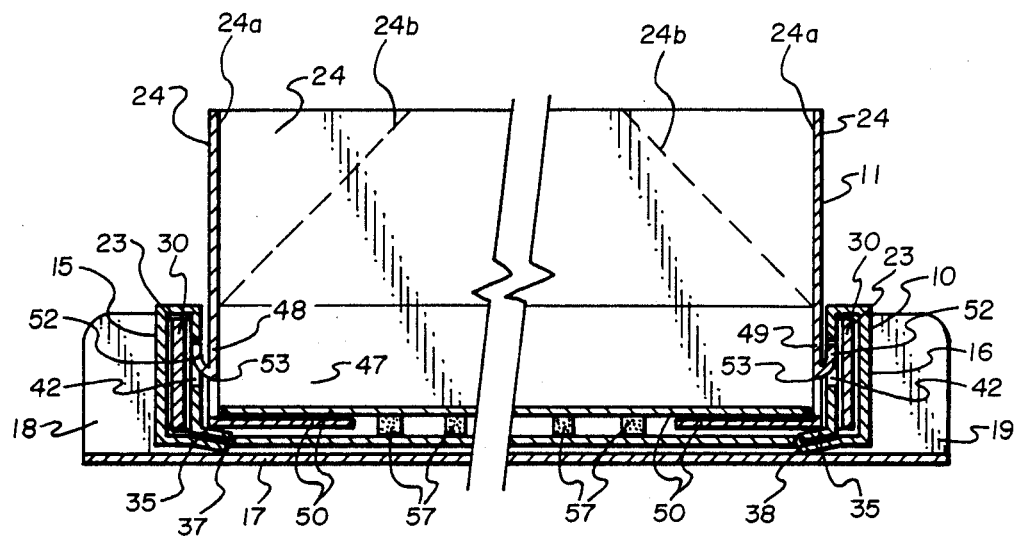
FIG. 6 is an enlarged cross section of FIG. 1(*c*) taken along line 6—6, with the center portion removed.

Separate height extender retention tabs 52 are connected to the left side 48 and right side 49. Height extender retention tabs 52 are positioned such that they engage height extender retention slots 42 when height extender 11 is positioned within box 10 as illustrated in FIG. 6. Preferably, height extender retention tabs 52 are punch out tabs which are folded in an outward direction from the interior of height extender 11 along score lines 53. Extending above front side 46, back side 47, left side 48 and right side 49 of height extender 11 are extension flaps 24. Extension flaps 24 are formed by folding extension flaps 24 along score lines 54, and the corners 24a between the extension flaps 24 are formed by folding along score lines 45. The extension flap 24 attached to the front side 46 has a notch 55 cut in its upper edge. Notch 55 is located approximately in the center of the top edge of the extension flap 24 associated with front side 46, and the size of notch 55 depends on the animal using the animal commode to provide proper access for the animal in and out of the animal commode. When the extension flaps 24 are in the folded horizontal position, the corners 24a fold inward along score lines 45 and perforation lines 24b, and the corners 24a reverse upon themselves as illustrated in FIGS. 1(b) and 7. This folding motion only requires contact with the outer surface of the height extender.

FIG. 6 is an enlarged cross section view along line 6—6 of FIG. 1(c) of the animal commode in the open and fully extended position ready for use by an animal, with the center portion removed. FIG. 6 illustrates the retention of the height extender 11 within box 10 by engagement of the height extender retention tabs 52 into the height extender retention slots 42. Also illustrated is the formation of left wall 15 and right wall 16 by engagement of the left wall retention tab 35 and right wall retention tab 36 into left wall retention slot 37 and right wall retention slot 38, respectively. Also illustrated are front retention slots 23 formed by the wrapping of left wall 15 and right wall 16 around their respective corner sealing tabs 30. By insertion of the corner sealing tabs 30 into front retention slots 23, the corners of box 10 are formed along score lines 31. Front retention slots 23 are also the slots into which the left sealing tab 21 and right sealing tab 22 are inserted upon sealing of box 10. Preferably, height extender 11 is also glued into box 10 by spot gluing 57 the bottom of the support tabs 50 to the top surface of bottom wall 12.

After the animal commode is assembled and in the open position with the height extender extended, it is filled to a suitable depth with an appropriate litter material. It is preferable that the litter materials have properties for odor control and moisture absorbency. The preferred litter material is a blend of diatomaceous earth and clinoptilolite, a particular zeolite mineral. Clinoptilolite is a zeolite having a strong affinity for ammonia and other organic compounds. This cation and organic compound affinity results in the odor control qualities of clinoptilolite. To increase the moisture absorbency of the preferred litter material, the clinoptilolite is blended with diatomaceous earth. Diatomaceous earth can absorb approximately four times its weight in moisture. The preferred ratio of the blend, by dry volume, is approximately one-third clinoptilolite and two-thirds diatomaceous earth or, by dry weight, is approximately two pounds clinoptilolite and three pounds diatomaceous earth. Test results of this blend of litter material indicate that approximately five pounds of litter material will last approximately four to six weeks for an average size house cat under normal use.

Whereas, this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:
1. A disposable commode for animals comprising:
   (a) a six-sided structure having a bottom wall, four side walls and an articulating top wall which is attached to one of the side walls and which may be rotated between a closed position and an open position;
   (b) a sealing means for sealing the six-sided structure when the articulating top wall is in the closed position so as to substantially retain a litter material and animal waste within the six-sided structure; and
   (c) a height extender which is positioned inside of the six-sided structure, the height extender having four walls which are adjacent to the four walls of the six-sided structure when the height extender is positioned inside of the six-sided structure, and having an articulating extension flap associated with each of the walls of the height extender which, rotates from a folded horizontal position to an extended vertical position such that the height of the side walls of the six-sided structure is sufficiently extended by the extension flaps to substantially retain a litter material within the commode when in use by an animal and such that when the flaps are rotated to the folded horizontal position the height extender is retained within the six-sided structure when the articulating top wall is in the closed position, and each of the extension flaps being connected at their edges to form corners which reverse inward upon themselves when the extension flaps are in the folded horizontal position.

2. A commode for animals as claimed in claim 1 wherein the sealing means is resealable and comprises a plurality of sealing flaps attached to the articulating top wall which associate with the four walls of the six-sided structure to substantially retain a litter material within the six-sided structure when the articulating top wall is in the closed position.

3. A commode for animals as claimed in claim 2 wherein the six-sided structure is constructed of a moisture resistant material.

4. A commode for animals as claimed in claim 2 further comprising a litter material which is a blend of clinoptilolite and high quality diatomaceous earth.

5. A commode for animals as claimed in claim 4 wherein the blend of clinoptilolite and high quality diatomaceous earth is in the approximate dry volume ratio of one-third clinoptilolite and two-thirds diatomaceous earth.

6. A commode for animals as claimed in claim 1 further comprising a litter material which is a blend of clinoptilolite and high quality diatomaceous earth.

7. A commode for animals as claimed in claim 6 wherein the blend of clinoptilolite and high quality diatomaceous earth is in the approximate dry volume ratio of one-third clinoptilolite and two-thirds diatomaceous earth.

* * * * *